United States Patent Office 3,136,350
Patented June 9, 1964

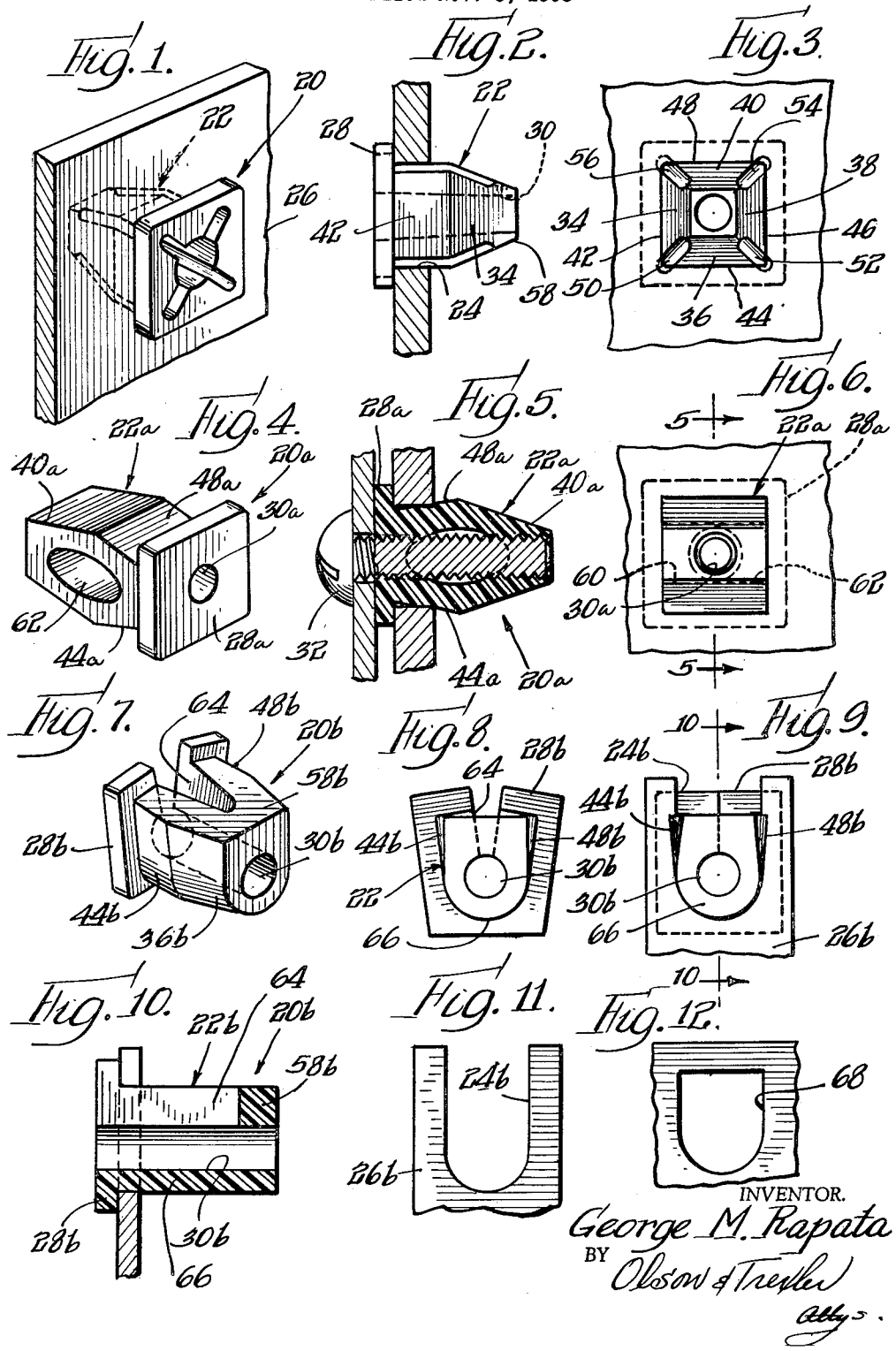

3,136,350
PLASTIC SCREW ANCHOR
George M. Rapata, Park Ridge, Ill., assignor to Illinois Tool Works, Inc., a corporation of Delaware
Filed Nov. 3, 1958, Ser. No. 771,485
4 Claims. (Cl. 151—41.75)

The present invention relates to novel anchor members, and more particularly to novel anchor members of the type adapted to be inserted into an apertured workpiece for receiving threaded fasteners such as screws and the like.

Certain heretofore suggested anchor members have been constructed from plastic material so that screws may be inserted therein without prior threading of the anchor member. These devices are especially useful in electrical installations where the screw must be insulated from the workpiece and also in installations where it is desired to mount a screw or the like in material such as porcelain or glass. Many of the heretofore proposed anchor members have been generally provided with a flexible shank portion insertable into a tightly fitting workpiece aperture, which shank portion is expanded when a screw member is threaded therein. In many instances, the shanks of the heretofore suggested devices comprise a plurality of separate elements which are too flexible whereby only partial threads are formed in the anchor member during application of a screw so that the full holding power of the anchor member is not realized. Certain heretofore proposed anchor members have been provided with shank portions which are too rigid so that the anchor members are not readily insertable into a workpiece aperture.

An important object of the present invention is to provide a novel anchor member which is constructed so that the full holding power of the anchor member will be realized after the assembly of a screw member therewith and so that the anchor member may be easily applied to an apertured workpiece.

Still another object of the present invention is to provide a novel anchor member of the above described type which is constructed so that the anchor member will be adequately retained against inadvertent disassembly from a workpiece during application of a screw member thereto whereby such application of the screw member is facilitated.

Still another object of the present invention is to provide a novel one piece plastic anchor member of the above described type which is constructed so as to reduce any tendency of a screw member to progress into the anchor member out of alignment or at an angle to the axis of the anchor member so that proper assembly of the screw member is facilitated.

Other objects and advantages of the present invention will become apparent from the following description and the accompanying drawings wherein:

FIG. 1 is a perspective view showing an anchor member incorporating features of the present invention assembled with an apertured workpiece;

FIG. 2 is a partial sectional view showing the anchor member assembled with the workpiece;

FIG. 3 is a fragmentary end elevational view of the workpiece and anchor member assembly;

FIG. 4 is a perspective view showing a modified form of the present invention;

FIG. 5 is a sectional view taken along line 5—5 in FIG. 6;

FIG. 6 is an entering end elevational view of the fastener shown in FIGS. 4 and 5 in assembled relationship with a workpiece;

FIG. 7 is a perspective view showing another embodiment of the present invention;

FIG. 8 is an entering end view of the device shown in FIG. 7;

FIG. 9 is an entering end elevational view of the device shown in FIGS. 7 and 8 in assembled relationship with a workpiece;

FIG. 10 is a sectional view taken along line 10—10 in FIG. 9;

FIG. 11 is a fragmentary view which shows one type of apertured workpiece adapted to accommodate the anchor member shown in FIG. 7; and FIG. 12 is an elevational view showing another type of apertured workpiece adapted to accommodate the anchor member shown in FIG. 7.

Referring now more specifically to the drawings, wherein like parts are designated by the same numerals throughout the various figures, an anchor member 20 incorporating features of the present invention is shown in FIGS. 1–3. The anchor member 20 is preferably molded from plastic material, but, if desired, various other materials may be used.

The anchor member 20 includes a shank section 22 adapted to be inserted into an aperture 24 in a workpiece or panel 26. Integral with a trailing end of the shank section is a head section 28 which is adapted to overlie an outwardly facing surface of the workpiece to prevent the anchor member from passing entirely through the aperture. The head section is preferably non-circular in peripheral configuration whereby it may be engaged by suitable means, not shown, for preventing the anchor member from rotating relative to the panel during application of a screw or the like to the anchor member. A bore 30 extends through the head and shank sections for receiving a screw such as the screw 32 which is shown in association with the anchor member in FIG. 5. The internal surfaces of the anchor member defining the bore 30 are preferably initially smooth so that upon the application of the screw element to the anchor member, complementary threads are cut into the anchor member by the screw. As indicated best in FIG. 2, the bore 30 is tapered toward the entering end of the anchor member so that the anchor member increasingly aggressively engages the screw as the screw is threaded into the bore.

As shown in FIGS. 1–3, the shank section 22 is rectangular in cross section configuration and the sides of the shank section have tapering entering end portions 34, 36, 38 and 40 for facilitating insertion of the anchor member into the workpiece aperture. The sides of the shank section have broad substantially flat surfaces 42, 44, 46 and 48 adjacent the head section 28 and adapted to fit snugly within the workpiece aperture for resisting rotation of the anchor member relative to the workpiece and for retaining the anchor member within the workpiece aperture prior to assembly of the screw member.

In order to accomplish a screw connection between the anchor member and the workpiece, the shank section of the anchor member is constructed so that it will be expanded upon application of the screw thereto for causing portions of the surfaces 42—48 to engage behind the panel. Thus the shank section is provided with axially extending and diagonally disposed slots 50, 52, 54 and 56 which intersect the four corners of the shank section and also the wall of the bore 30. As a result, the shank section is, in effect, provided with four axially extending flexible elements for accommodating and securely embracing a screw and for engaging behind the workpiece. The slots preferably extend through the head section of the anchor member so as to provide the head section with desired flexibility or expandability for accommodating the screw. The maximum diameter of the bore 30 is sufficiently less than the outside or crest diameter of the threads on the screw so that full depth complementary threads may be formed in the wall of the bore 30 during insertion of the screw. It is to be noted that the slots terminate short of the entering end of the shank section so that the shank section includes a peripherally continuous entering end portion 58. This serves to retain the outer or entering ends of the separate and flexible side elements of the anchor section together during the application of the screw element so as to insure the formation of full depth threads through the length of the anchor member.

The anchor member 20 is applied to the workpiece merely by inserting the shank section through the aperture 24. The peripherally continuous entering end portion of the shank section insures that the flexible side elements of the shank are held in proper relationship with respect to each other so as to eliminate any possibility of breaking the shank during driving of the anchor member into the apertured workpiece. When the anchor member is fully seated within the workpiece aperture, the screw element is threaded into the bore 30 so that the flexible axially extending side elements of the shank section are expanded into aggressive engagement with the workpiece for preventing withdrawal of the anchor member. Since undue expansion of the shank elements is prevented by engagement with the workpiece and also by the circumferentially continuous entering end portion of the shank, full depth threads will be formed throughout the length of the anchor member for providing maximum holding power. In addition, the anchor member will resiliently and tightly grip the screw element so that the screw element is effectively locked against unauthorized retrograde movement. The circumferentially continuous free or entering end of the shank also eliminates relatively sharp edges or points at the exposed end of the anchor member which might snag a person working around or near the assembled anchor member.

FIGS. 4, 5 and 6 illustrate an anchor member 20a which is similar to the structure described above as indicated by the application of identical reference numerals with the suffix "a" added to corresponding elements. This embodiment differs in that the opposite side surface portions 44a and 48a of the shank section are disposed in diverging relationship for providing shoulders engageable behind the workpiece or panel even prior to application of the screw element 32 to the anchor member. In addition, the above described slots have been replaced by a pair of wide and generally oval-shaped slots 60 and 62 located entirely within the shank section whereby the shank section is provided with two rather than four generally axially extending flexible side elements. With this arrangement, the head section 28a is somewhat stiffer than the above described head section, but this is offset by the relatively wide and oval-shaped slots which impart the desired resiliency to the opposite sides of the shank section.

FIGS. 7 through 10 show an anchor member 20b similar to the structure described above as indicated by the application of identical reference numerals with the suffix "b" added to corresponding elements. In this embodiment, a single slot 64 is provided in one side of the shank section, which slot has side walls diverging from a point adjacent the continuous entering end portion 58b toward and through the head section 28b. As shown best in FIG. 8, a side 66 of the shank section 22b opposite from the slot 64 is rounded and the opposite flexible side portions of the shank diverge with respect to each other in a direction extending transversely of the slot. Thus the anchor member 20b is adapted to be applied to a U-shaped opening 24b in the edge of a workpiece 26b as shown in FIGS. 9 and 11. The anchor member is also adapted to be applied to a generally D-shaped opening 68 shown in a workpiece in FIG. 12.

While the preferred embodiments of the present invention have been shown and described herein, it is obvious that many changes may be made in structural details without departing from the spirit and scope of the appended claims.

The invention is claimed as follows:

1. A one piece plastic anchor member for application to an apertured work piece in position to accommodate a screw member having a threaded shank of a predetermined diameter, said plastic anchor member including a head section providing a surface for engaging one side of said work piece after insertion within the aperture thereof, and a shank section extending axially from said head section and having a polygonal transverse cross-section, said shank section being insertable within a complementary polygonal aperture in said work piece for resisting relative rotation between said anchor member and work piece, said head section having an axial substantially circular screw accommodating bore extending therethrough which is bounded by a circumferentially continuous wall surface, said shank section having an axial screw accommodating passageway communicating with and extending coaxially with respect to said bore, a first pair of opposite outer side surfaces of said shank section including portions diverging from adjacent the work engaging surface of said head section and providing shoulder means spaced axially from said head section and adapted to engage the side of a work piece opposite from the side engaged by said head section for resisting withdrawal of the anchor member from said work piece, said side surfaces also including converging portions extending from adjacent said shoulder means toward a free entering extremity of said shank section, said shank section including longitudinal slot means extending radially outwardly from opposite sides of said passageway and intercepting a second pair of opposite side surface of the shank section, said slot means at one extremity terminating short of said head section and at its opposite extremity terminating short of the entering end of said shank section, the entering extremity of said shank section having a substantially circular screw accommodating bore coaxially disposed with respect to the bore in the head section and bounded by a circumferentially continuous wall surface, the aforesaid bores having a diameter less than the diameter of the screw shank to be accommodated thereby for promoting the formation of full depth threads in the surfaces bounding said bores when a threaded screw element is applied thereto, said shank passageway and said slot means radiating therefrom increasing in width from opposite extremities to an area of maximum width in the vicinity of said shoulder means so as to increase the lateral resiliency the shank portions in that vicinity and thereby effect foreshortening of the shank section sufficiently to expand said shoulders into locking engagement with the adjacent walls of the work piece as an incident to tightening of said screw member within the anchor member.

2. A one piece plastic anchor member as set forth in claim 1 wherein the longitudinal shank passageway and slot means present an oval shape longitudinally of the shank section.

3. A one piece plastic anchor member, as defined in claim 1, wherein said slot means is partially defined by opposite arched side surfaces in the vicinity of said shoulder means.

4. A one piece plastic member, as defined in claim 3, wherein said slot means has a generally oval cross section which is elongated axially of said shank section.

References Cited in the file of this patent

UNITED STATES PATENTS

| 1,111,660 | Malaby | Sept. 22, 1914 |
| 2,067,039 | Aver | Jan. 5, 1937 |
| 2,788,047 | Rapata | Apr. 9, 1957 |
| 2,836,214 | Rapata | May 27, 1958 |

FOREIGN PATENTS

| 1,122,378 | France | May 22, 1956 |
| 589,648 | Great Britain | June 26, 1947 |
| 707,819 | Great Britain | Apr. 21, 1954 |